US009703546B1

(12) United States Patent
Clark et al.

(10) Patent No.: US 9,703,546 B1
(45) Date of Patent: Jul. 11, 2017

(54) MONITORING APPLICATION STATES FOR DEPLOYMENT DURING RUNTIME OPERATIONS (71) Applicant: Invensys Systems, Inc., Foxboro, MA (US)

(72) Inventors: Scott William Clark, South Melbourne (AU); Niels Erik Andersen, Dana Point, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 0 days.

(21) Appl. No.: 14/976,052

(22) Filed: Dec. 21, 2015

(51) Int. Cl.
*G06F 9/44* (2006.01)
*G06F 9/445* (2006.01)

(52) U.S. Cl.
CPC ...................... *G06F 8/65* (2013.01)

(58) Field of Classification Search
CPC .......................................................... G06F 8/65
USPC ................................. 717/168–178; 709/203
See application file for complete search history.

(56) References Cited

U.S. PATENT DOCUMENTS

| 5,261,114 | A | * | 11/1993 | Raasch | G06F 8/65 |
| | | | | | 709/221 |
| 6,385,643 | B1 | * | 5/2002 | Jacobs | G06F 9/465 |
| | | | | | 709/201 |
| 6,779,177 | B1 | * | 8/2004 | Bahrs | G06F 9/542 |
| | | | | | 717/136 |
| 6,799,080 | B1 | | 9/2004 | Hylden et al. | |
| 7,003,767 | B2 | * | 2/2006 | Larkin | G06F 8/65 |
| | | | | | 717/169 |
| 7,073,172 | B2 | * | 7/2006 | Chamberlain | G06F 8/61 |
| | | | | | 717/169 |
| 7,496,911 | B2 | * | 2/2009 | Rowley | G06F 8/61 |
| | | | | | 717/174 |
| 7,702,739 | B1 | * | 4/2010 | Cheng | H04L 47/10 |
| | | | | | 709/203 |
| 7,827,237 | B2 | * | 11/2010 | Plamondon | H03M 7/30 |
| | | | | | 341/87 |
| 8,010,777 | B2 | * | 8/2011 | Nandan | G06F 8/61 |
| | | | | | 709/220 |
| 8,261,254 | B2 | * | 9/2012 | Cook | G06F 8/67 |
| | | | | | 707/822 |
| 8,291,490 | B1 | * | 10/2012 | Ahmed | G06F 21/604 |
| | | | | | 726/17 |

(Continued)

FOREIGN PATENT DOCUMENTS

EP 2490086 A1 8/2012
JP 2009301417 A 12/2009

OTHER PUBLICATIONS

Ward et al, "Self Managing Monitoring for Highly Elastic Large Scale Cloud Deployments ", ACM, pp. 3-10, 2014.*

(Continued)

*Primary Examiner* — Anil Khatri
(74) *Attorney, Agent, or Firm* — Stephen Manalla; Susmita Bhandari (57) ABSTRACT

Interaction between development environments and runtime environments to ensure that underlying process components are in an acceptable state before deploying application updates. A deploy state monitor in a development environment interacts with runtime values in executing applications to manage deployment requests and states of executing applications.

18 Claims, 8 Drawing Sheets

(56) References Cited

U.S. PATENT DOCUMENTS

| | | | | |
|---|---|---|---|---|
| 8,640,117 B2* | 1/2014 | Sugimoto | ............... | G06F 8/65 717/168 |
| 8,661,432 B2* | 2/2014 | Kriebel | ............... | G06Q 10/00 715/744 |
| 8,688,803 B2* | 4/2014 | Manion | ............... | H04L 67/104 707/622 |
| 8,745,272 B2* | 6/2014 | Casalaina | ......... | G06F 17/30528 709/203 |
| 8,938,734 B2* | 1/2015 | Misovski | ............... | G06F 8/61 717/168 |
| 2009/0287321 A1 | 11/2009 | Lucas et al. | | |

OTHER PUBLICATIONS

Wang et al, "A Mechanism of Automated Monitoring Deployment in Grid Environment", ACM, pp. 1-7, 2008.*
Burg et al, "A Self-Adaptive Deployment Framework for Service-Oriented Systems ", ACM, pp. 208-217, 2011.*
Dolstra et al, "Imposing a Memory Management Discipline on Software Deployment", IEEE, pp. 1-10, 2004.*
Partial European Search Report for 16205969.5, dated May 19, 2017.

* cited by examiner

MONITORING APPLICATION STATES FOR DEPLOYMENT DURING RUNTIME OPERATIONS

BACKGROUND

Aspects of the present invention generally relate to development and configuration of processor-executable applications that monitor and/or control components in industrial processes. More particularly, aspects of the present invention relate to systems and methods for monitoring the deployment of applications during runtime operations.

Control system development environments allow for the configuration, development, and deployment of applications to runtime environments on control components in industrial processes. Conventional systems and methods rely on a human (e.g., a programmer, an operator, etc.) to manually determine whether portions of an industrial process impacted by an impending application deployment are in a safe state before commencing the deployment. Reliance on manual determinations leads to inefficient process operation due to a reluctance to shut down operations for deploying application updates and/or causes process failure when the determination about the state of the process is incorrect.

SUMMARY

Aspects of the invention provide interaction between development environments and runtime environments to ensure that the impacted process components are in an acceptable state before deploying an application update.

In an aspect, a system includes a server computing device coupled to a control device by a communications network. The control device is configured to execute processor-executable instructions to provide a runtime environment. The system also includes processor-executable instructions stored on a computer-readable storage medium. When executed by the server computing device instructions of the processor-executable instructions provide a development environment associated with the runtime environment and an instance of an application object within the development environment. The development environment interacts with a deploy state monitor executing within an instance of the application object executing in the runtime environment. The interaction is based on an operational state of the instance of the application object executing in the runtime environment. Based on the interaction, the system determines when the control device is in a safe state before deploying an update.

In another aspect, a method of deploying an update of an application object during a runtime operation includes executing a deploy state monitor within a runtime environment via processor-executable instructions stored on a computer-readable storage medium of a control device. The control device is coupled to a computing device by a communications medium. The computing device provides a development environment associated with the runtime environment via processor-executable instructions stored on a computer-readable storage medium. The method also includes providing an instance of an application object within the development environment. Moreover, the method includes initiating a deployment of an update of the application object within the development environment to an instance of the application object executing in the runtime environment. The deploy state monitor interacts with the instance of the application object executing in the runtime environment based on an operational state of the instance of the application object executing in the runtime environment. The interaction permits the application object to determine when the control device is in a safe state for the deployment. The method also includes deploying the update in the runtime environment via the communications medium in response to the interacting.

In yet another aspect, a system includes a controller and a computing device. The controller is coupled to an industrial process and includes a processor executing processor-executable instructions to provide a runtime execution environment. The computing device is coupled to the controller by a communications network and includes a processor executing processor-executable instructions to provide a development environment associated with the runtime environment. A deploy state monitor executing within the runtime environment is configured to interact with an application object executing within the runtime execution environment. The interaction is based on an operational state of the application object executing in the runtime environment. The interaction enables the application object to determine when the controller is in a safe state before deployment of an update of the application object from the development environment to the runtime execution environment.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
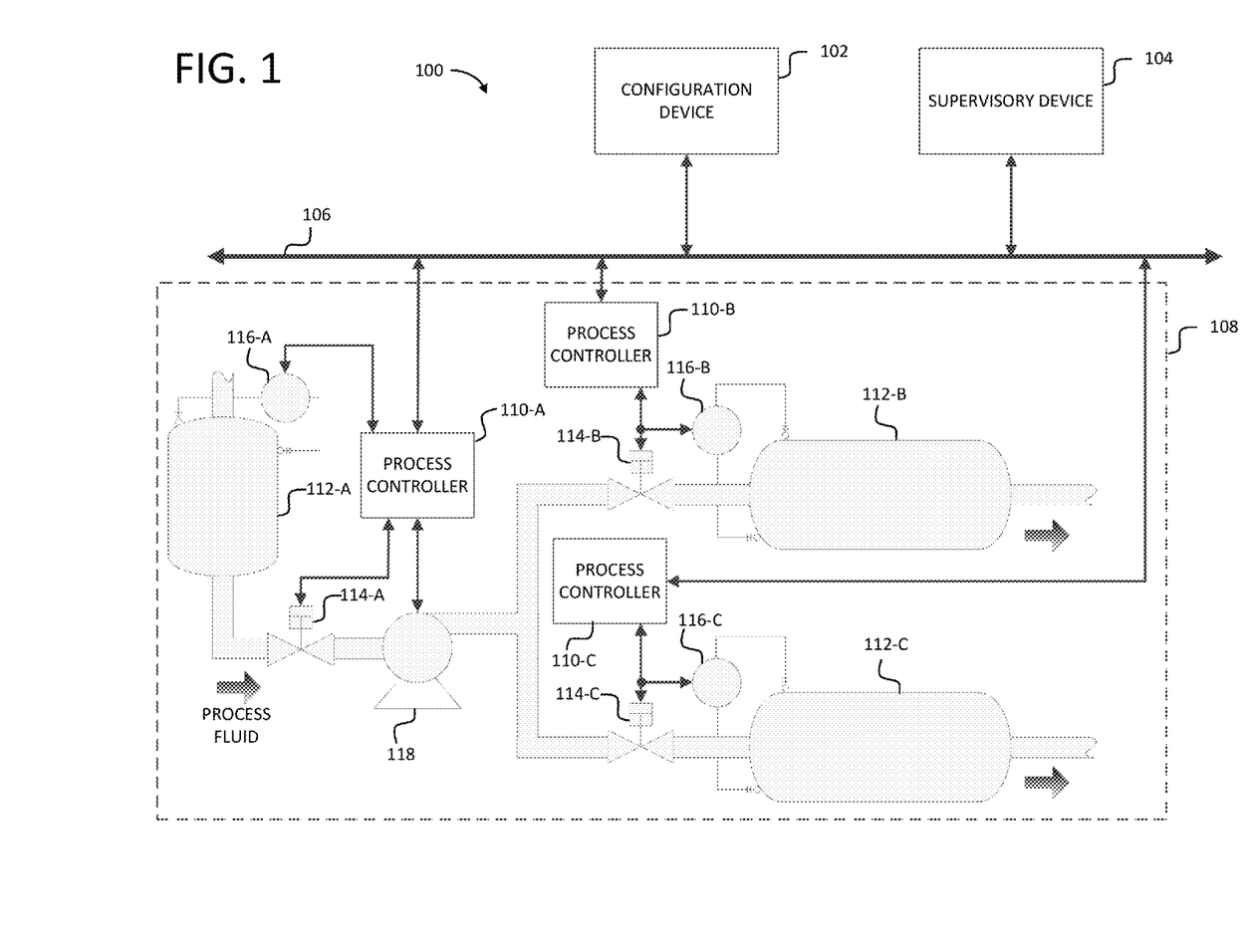
FIG. 1 illustrates an exemplary industrial process system within which aspects of the invention may be incorporated.

FIG. 1 illustrates an exemplary system 100 within which an embodiment of the invention may be incorporated. The system 100 includes a configuration device 102, a supervisory device 104, a communications infrastructure 106, and an exemplary plant, such as a fluid processing system 108. As illustrated, the fluid processing system 108 includes process controllers 110, tanks 112, valves 114, sensors 116, and a pump 118. In system 100, the configuration device 102, the supervisory device 104, the process controllers 110, the tanks 112, the valves 114, the sensors 116, and the pump 118 are communicatively coupled via the communications infrastructure 106.

The configuration device 102 is adapted to provide a development environment that enables the design, development, and deployment of applications that are executed by process controllers 110 to control aspects of fluid processing system 108. In the exemplary embodiment of FIG. 1, configuration device 102 executes processor-executable instructions embodied on a storage memory device to provide the development environment and other capabilities via a software environment, as further described herein. In an embodiment, configuration device 102 is any computing device capable of executing processor-executable instructions including, but not limited to, one or more servers.

The supervisory device 104 is adapted to enable management of applications. In an embodiment, supervisory device 104 executes processor-executable instructions embodied on a storage memory device to provide a human-machine interface (HMI) application manager. For example, aspects of supervisory device 104 may provide a graphical representation of components of fluid processing system 108 that facilitates monitoring and administration of a manufacturing process. In an embodiment, an HMI is configured to interact with update logic in a process controller 110 to alarm or prompt a user of an update and to provide operator feedback where required. An exemplary HMI application manager is the Wonderware System Platform available from Schneider Electric. In another embodiment, aspects of application management are provided by configuration device 102.

The communications infrastructure 106 is capable of facilitating the exchange of data among various components of system 100, including configuration device 102, supervisory device 104, and components of fluid processing system 108 (e.g., process controllers 110, valves 114, sensors 116, etc.). The communications infrastructure 106 in the embodiment of FIG. 1 includes a local area network (LAN) that is connectable to other telecommunications networks, including other LANs or portions of the Internet or an intranet. The communications infrastructure 106 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 106 is any medium that allows data to be physically transferred through serial or parallel communication channels (e.g., copper, wire, optical fiber, computer bus, wireless communication channel, etc.). In an embodiment, communications infrastructure 106 comprises at least in part a process control network.

Still referring to FIG. 1, the fluid processing system 108 is adapted for changing or refining raw materials to create end products. It will be apparent to one skilled in the art that aspects of the present invention are capable of optimizing processes and processing systems other than fluid processing system 108 and that system 108 is presented for illustration purposes only. Additional exemplary processes include, but are not limited to, those in the chemical, oil and gas, food and beverage, pharmaceutical, water treatment, and power industries. For example, processes may include conveyers, power distribution systems, and/or processes or operations that cannot be interrupted. In an embodiment, process controllers 110 provide an interface or gateway between components of fluid processing system 108 (e.g., valves 114, sensors 116, pump 118) and other components of system 100 (e.g., configuration device 102, supervisory device 104). In another embodiment, components of fluid processing system 108 communicate directly with configuration device 102 and supervisory device 104 via communications infrastructure 106. In yet another embodiment, process controllers 110 transmit data to and receive data from configuration device 102, supervisory device 104, valves 114, sensors 116, and/or pump 118 for controlling and/or monitoring various aspects of fluid processing system 108.

The process controllers 110 of FIG. 1 are adapted to control and/or monitor aspects of fluid processing system 108. In an embodiment, processor controllers 110 are programmable logic controllers (PLC) that control and collect data from aspects of fluid processing system 108.

Figure 2:
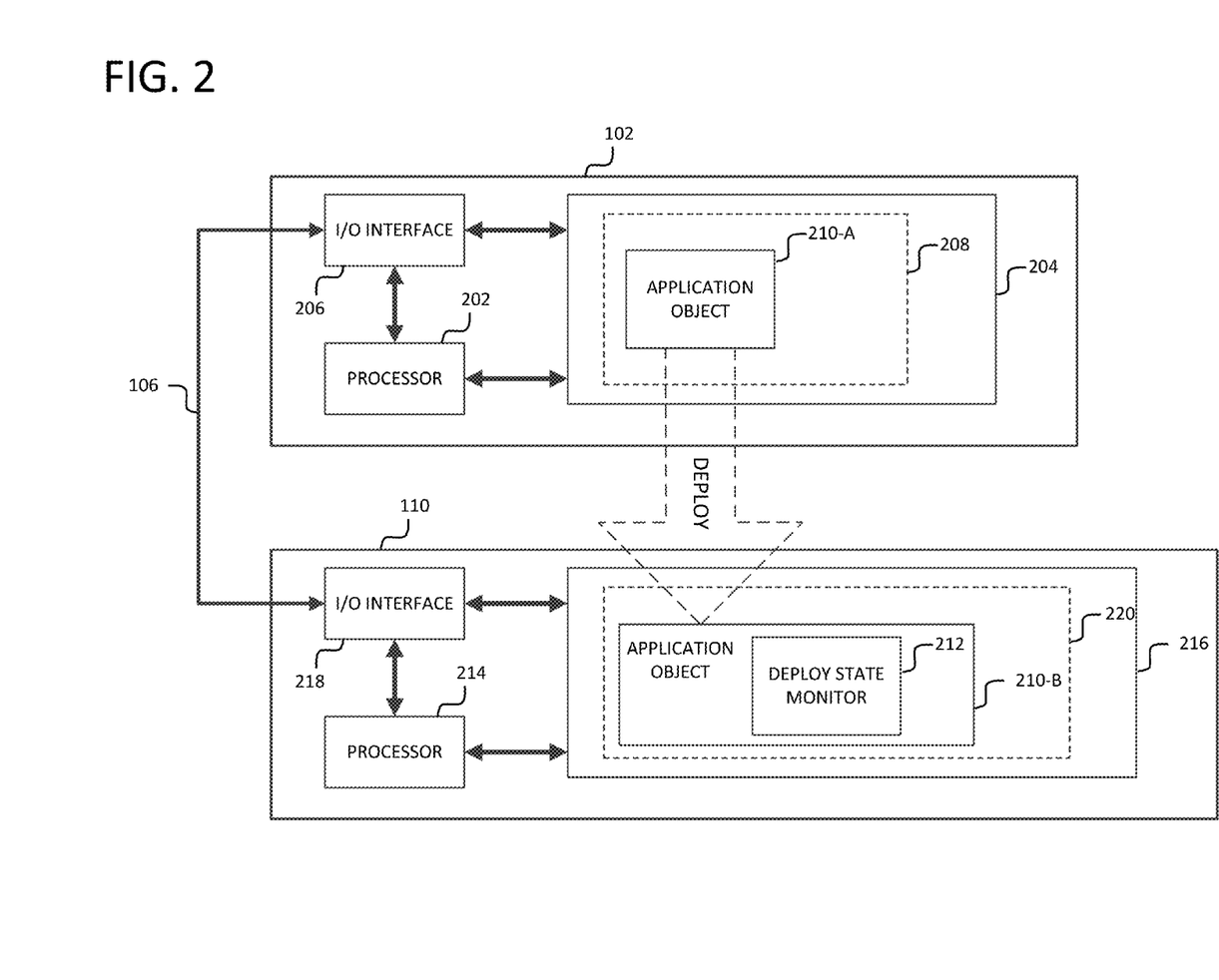
FIG. 2 illustrates an exemplary architecture of computing devices programmed to provide interaction between a development environment and a runtime environment according to an embodiment of the invention.

FIG. 2 illustrates an exemplary configuration-controller architecture of configuration device 102 and one of process controllers 110. In this embodiment, configuration device 102 includes a processor 202, a memory 204, and an input/output (I/O) interface 206 that is adapted to interface with communications infrastructure 106. The memory 204 includes a development environment 208, which further includes an application object 210, shown as application object 210-A. The process controller 110 in this embodiment also includes a processor 214, a memory 216, and an I/O interface 218 that is adapted to interface with communications infrastructure 106. The memory 216 includes a runtime environment 220, which further includes application object 210, shown as application object 210-B, and a deploy state monitor 212.

Referring further to FIG. 2, processor 202, memory 204, and I/O interface 206 are communicatively connected and/or electrically connected to each other. The I/O interface 206 is communicatively and/or electrically connected to communications infrastructure 106. The processor 202 is adapted to execute processor-executable instructions stored in memory 204 for implementing the development environment 208 and/or the application object 210. Similarly, processor 214, memory 216, and I/O interface 218 are communicatively connected and/or electrically connected to each other. The I/O interface 218 is communicatively and/or electrically connected to communications infrastructure 106. The processor 214 is adapted to execute processor-executable instructions stored in memory 216 for implementing the runtime environment 220, application object 210, and/or the deploy state monitor 212.

The I/O interfaces 206, 218 of FIG. 2 are each adapted to provide a data connection between communications infrastructure 106 and either configuration device 102 or process controller 110, respectively. In an embodiment of the invention, I/O interfaces 206, 218 are network interface cards (NIC) or modems. In another embodiment, I/O interfaces 206, 218 are each adapted to provide a data connection between a user input device and either configuration device 102 or process controller 110, respectively. Exemplary user input devices include, but are not limited to, a keyboard, a mouse, and a touchscreen. The I/O interfaces 206, 218 of FIG. 2 are each, for example, an integrated circuit that allows data to be physically transferred through serial or parallel communication channels.

The development environment 208 of FIG. 2, also referred to as a configuration environment, is adapted to enable design, development, and deployment of applications (e.g., application object 210) that are executed by process controllers 110 to control aspects of fluid processing system 108. In an embodiment, development environment 208 is an integrated development environment (IDE). In another embodiment, aspects of development environment 208 download firmware, configuration properties, and applications (i.e., programs) to process controllers 110. Aspects of development environment 208 may also read and/or write runtime values associated with runtime environment 220 on process controllers 110 for online debugging. In accordance with additional embodiments of the invention, development environment 208 may also interact with logic associated with deploy state monitor 212 during a deploy operation to control and/or monitor a state of application object 210.

The application object 210 is adapted to represent a physical or virtual control system element, hardware component, and/or other control structure. In an embodiment, application object 210 is software code (e.g., processor-executable instructions) and/or a data container that represents a certain component (e.g., one of tanks 112, valves 114, sensors 116, and/or pump 118) of fluid processing system 108. For example, application object 210 may represent inputs, outputs, structural attributes, and/or functional attributes of a physical component of fluid processing system 108. In certain embodiments described herein, application object 210-A refers to an application object embodied in development environment 208 and application object 210-B refers to an application object executing in runtime environment 220. In another embodiment according to aspects of the invention, application object 210-B includes code (e.g., processor-executable instructions) that can be used to transition itself into a safe state for a deploy and/or redeploy operation, such as IDLE, STOP, and the like. In yet another embodiment, application object 210-B can refuse a requested deploy operation or abort a current deploy operation based on monitored conditions. For example, if a deployment operation is staging while a tank (e.g., one of tanks 112) is about to overflow, the high level state can abort the deployment as further described herein. In further embodiments, application object 210-B utilizes timeouts, user intervention, deploy priority, scheduling, condition monitoring, and the like.

The deploy state monitor 212 is adapted to provide interaction between development environment 208 and runtime environment 220, without user intervention, to ensure that a component of fluid processing system 108 represented by application object 210 (and thus controlled and/or monitored by process controller 110) is in a safe state before deploying an update of application object 210 from development environment 208 to runtime environment 220. In an exemplary embodiment, deploy state monitor 212 manages the operational state of application object 210 during a deploy operation. As explained above, code and configuration data of application object 210-A is transmitted from development environment 208 to application object 210-B executing in runtime environment 220 during the deploy operation. In an embodiment, deploy state monitor 212 comprises a deploy function block with associated parameters executing in runtime environment 220 of process controller 110 as part of application object 210-B, as further described herein. In another embodiment, deploy state monitor 212 is adapted to provide seamless integration among aspects of configuration device 102, supervisory device 104, programmable logic controllers (PLC), distributed control systems (DCS), remote telemetry units (RTU), and embedded controllers. In yet another embodiment, deploy state monitor 212 provides interactions between development environment 208 and runtime environment 220 via a vendor application programming interface (API) associated with process controllers 110. In accordance with further aspects of the invention, deploy state monitor 212 is adapted to provide a safety mechanism by which incremental deploy operations that may interrupt process control operations are prevented.

Figure 3:
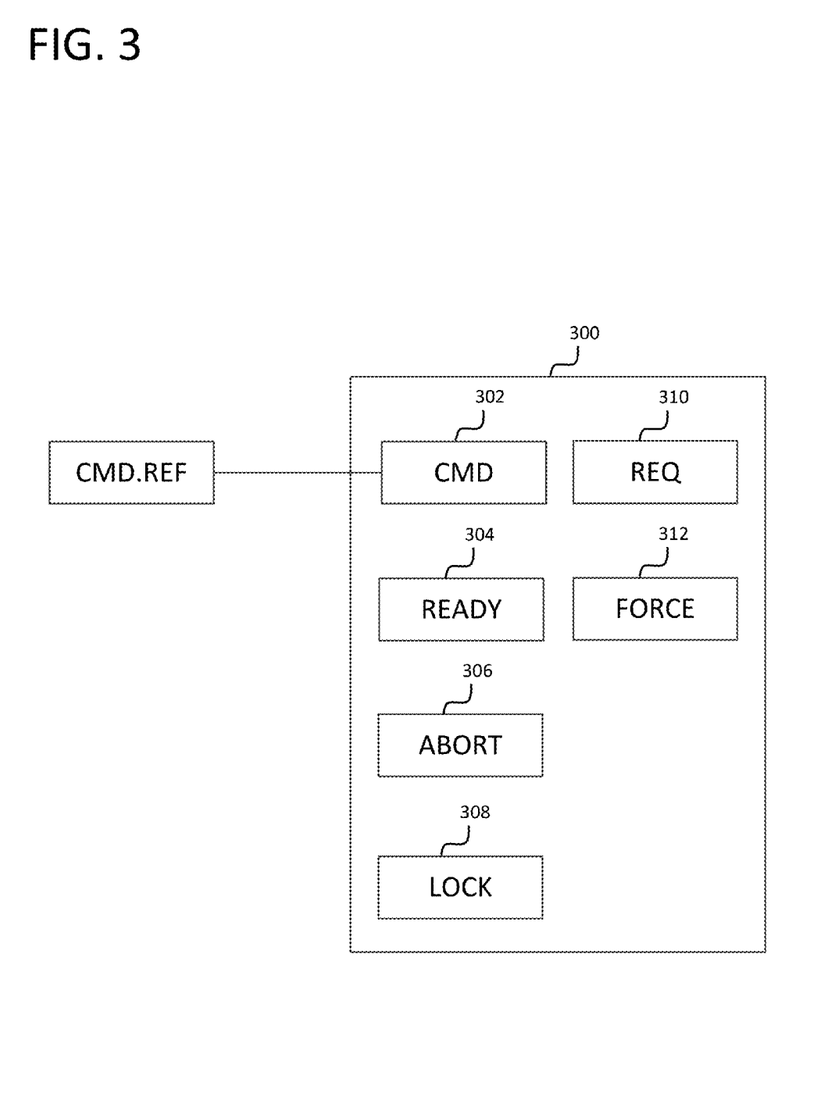
FIG. 3 illustrates an exemplary function block diagram for graphically representing aspects of the invention.

FIG. 3 illustrates an exemplary function block diagram of deploy state monitor 212, namely, deploy function block 300. In an embodiment, the deploy function block 300 describes the function between input variables and output variables of deploy state monitor 212. The deploy function block 300 may be utilized to represent aspects of deploy state monitor 212 in development environment 208. For example, in an embodiment in which development environment 208 provides graphical representations of aspects of fluid processing system 108 via a graphical user interface (GUI), deploy function block 300 provides a graphical representation of deploy state monitor 212 via the GUI. In another embodiment, deploy function block 300 graphically represents deploy state monitor 212 via a GUI to enable graphical configuration of aspects of deploy state monitor 212. The deploy function block 300 may be available in a standard library associated with a graphical design environment, in accordance with aspects of the invention.

According to aspects of the invention, deploy function block 300 includes associated code (e.g., processor-executable instructions that comprise a program) that implements deploy state monitor 212. In an embodiment, the code includes a program definition that contains logic handling a deployment operation. Exemplary code is included in APPENDIX A. One having ordinary skill in the art will understand that deploy function block 300 is exemplary for graphical language design and deploy state monitor 212 may also be represented by corresponding structures in languages that utilize ladder logic, sequential function charts, structured text, instruction lists, and the like. In the embodiment illustrated by FIG. 3, deploy function block 300 includes a CMD parameter 302, a READY parameter 304, an ABORT parameter 306, a LOCK parameter 308, a REQ parameter 310, and a FORCE parameter 312.

The CMD parameter 302 is adapted to facilitate interaction among other parameters, a deploy process, and/or an HMI (e.g., supervisory device 104). In an embodiment, CMD parameter 302 is a 16-bit integer value monitored and set by a deploy process (e.g., deploy application object 210 from development environment 208 to runtime environment 220). In this embodiment, the low byte is used by the deploy process to request a deployment of a certain application object 210 with which deploy function block 300 is associated. Also in this embodiment, the high byte is used by the program that implements deploy state monitor 212 to return the state set by READY parameter 304, ABORT parameter 306, and LOCK parameter 308. In an embodiment in which a system platform supports 8-bit values, CMD parameter 302 may be split into two values (e.g., one read value, one write value). In an embodiment in which a system platform supports larger bit values (e.g., 32-bit, 64-bit, etc.) aspects of the present invention limit CMD parameter 302 to a 16-bit value for consistent operation over all platforms.

The READY parameter 304 is adapted to provide an indication that an application object executing in a runtime environment is ready for a deploy operation. In an embodiment, READY parameter 304 is a Boolean value set to an ON (e.g., TRUE) value when application object 210-B executing in runtime environment 220 is ready for a deploy operation to modify application object 210-B to reflect changes made to application object 210-A. The READY parameter 304 can be monitored for a specific application object 210 being deployed. In another embodiment, READY parameter 304 is set from within code (e.g., processor-executable instructions) of application object 210-B that notifies a deploy process of the state of application object 210-B via the high byte of CMD parameter 302.

The ABORT parameter 306 is adapted to provide a request to abort a deploy operation. In an embodiment, ABORT parameter 306 is a Boolean value. For example, in an embodiment in which a deploy operation to modify application object 210-B to reflect changes made to application object 210-A is in progress, ABORT parameter 306 set to ON will abort the deploy operation. In an embodiment, an interface pin connected to ABORT parameter 306 and REQ parameter 310 enables a deploy operation to be aborted at the object instance level. In this embodiment, REQ parameter 310 prompts a user (e.g., via a GUI) for input to either abort or proceed with the deployment. An object symbol representing application object 210 is altered to notify a user for input and the notification and the abort or ready response is provided on a faceplate of the object. In another embodiment, ABORT parameter 306 is set from within code (e.g., processor-executable instructions) of application object 210-B that notifies a deploy process of the state of application object 210-B via the high byte of CMD parameter 302.

The LOCK parameter 308 is adapted to prevent modification of application object 210-B (e.g., via a deploy operation) executing on processor controller 110. In an embodiment, LOCK parameter 308 is a Boolean value that prevents a deploy operation that could interrupt safe operation of application object 210 due to an extension of the execution time by process controller 110 during a download of a program embodying application object 210. For example, when process controller 110, which includes a certain application object 210-B for which a deploy operation is requested, is performing a time critical operation, LOCK parameter 308 set to ON will prevent modification of application object 210-B during the time critical operation. In an embodiment, LOCK parameter 308 is monitored for all application objects 210-B executing on process controller 110. In such an embodiment, even if the application object 210-B that is the subject of the deploy operation isn't responsible for the time critical process, the deploy operation will still be prevented via LOCK parameter 308. One having ordinary skill in the art will thus understand that a deploy operation is prevented from modifying process controller 110 while any deploy function block 300 associated with an application object 210 on the controller has LOCK parameter 308 set on.

In another embodiment, LOCK parameter 308 is set from within code of application object 210 when the associated physical component is performing a time critical operation, such as monitoring for a momentary position feedback that may be missed during an extended scan cycle. In yet another embodiment, LOCK parameter 308 is set from within code (e.g., processor-executable instructions) of application object 210-B that notifies a deploy process of the state of application object 210-B via the high byte of CMD parameter 302.

The REQ parameter 310 of FIG. 3 is adapted to provide an indication that a deploy operation is initiated. In an embodiment, REQ parameter 308 is a Boolean value. In an exemplary embodiment, the low byte of CMD parameter 302 is set by a deploy operation to indicate that a deploy operation has been initiated. The deploy state monitor 212, executing on process controller 110 associated with the deploy operation, monitors CMD parameter 302 to set REQ parameter 310 to ON. In another embodiment, an instance of deploy function block 300 sets REQ parameter 310 output to TRUE (e.g., ON) to notify application object 210-B that a deployment has been requested. In this embodiment, application object 210-B is responsible for setting READY parameter 304 to ON (e.g., via processor-executable instructions) to indicate when application object 210-B is in a state ready for a deploy and/or redeploy operation.

The FORCE parameter 312 is adapted to provide an indication of a high-priority deploy operation. In an embodiment, FORCE parameter 312 is a Boolean value. In an exemplary embodiment, the low byte of CMD parameter 302 is set by a deploy operation to indicate that a high-priority (e.g., time critical, process critical, etc.) deploy operation has been initiated. The deploy state monitor 212, executing on process controller 110 associated with the deploy operation, monitors CMD parameter 302 to set FORCE parameter 312 to ON. In another embodiment, an instance of deploy function block 300 sets FORCE parameter 312 output to TRUE (e.g., ON) to notify application object 210-B that a forced deploy operation has been requested by the deploy process to change operational states with a greater sense of urgency. In this embodiment, application object 210-B is responsible for responding to this request by setting FORCE parameter 312 to ON (e.g., via processor-executable instructions) in a timely manner.

In an embodiment, a deploy process communicates with each deploy function block 300 instance being deployed to notify that a deploy operation has been initiated. This notification is sent to each deploy function block 300 instance via the low byte of the CMD parameter of each block 300. A deploy function block 300 instance sets its REQ parameter 310 to TRUE to notify the corresponding application object 210-B that a deployment has been requested. In a further embodiment, the deploy process monitors the values of the CMD parameter 302 of all deploy function block 300 instances during deploy to determine when the deploy operation can update the running program for each application object 210-B or if the deploy needs to abort due to operational conditions within the running program.

Figure 4:
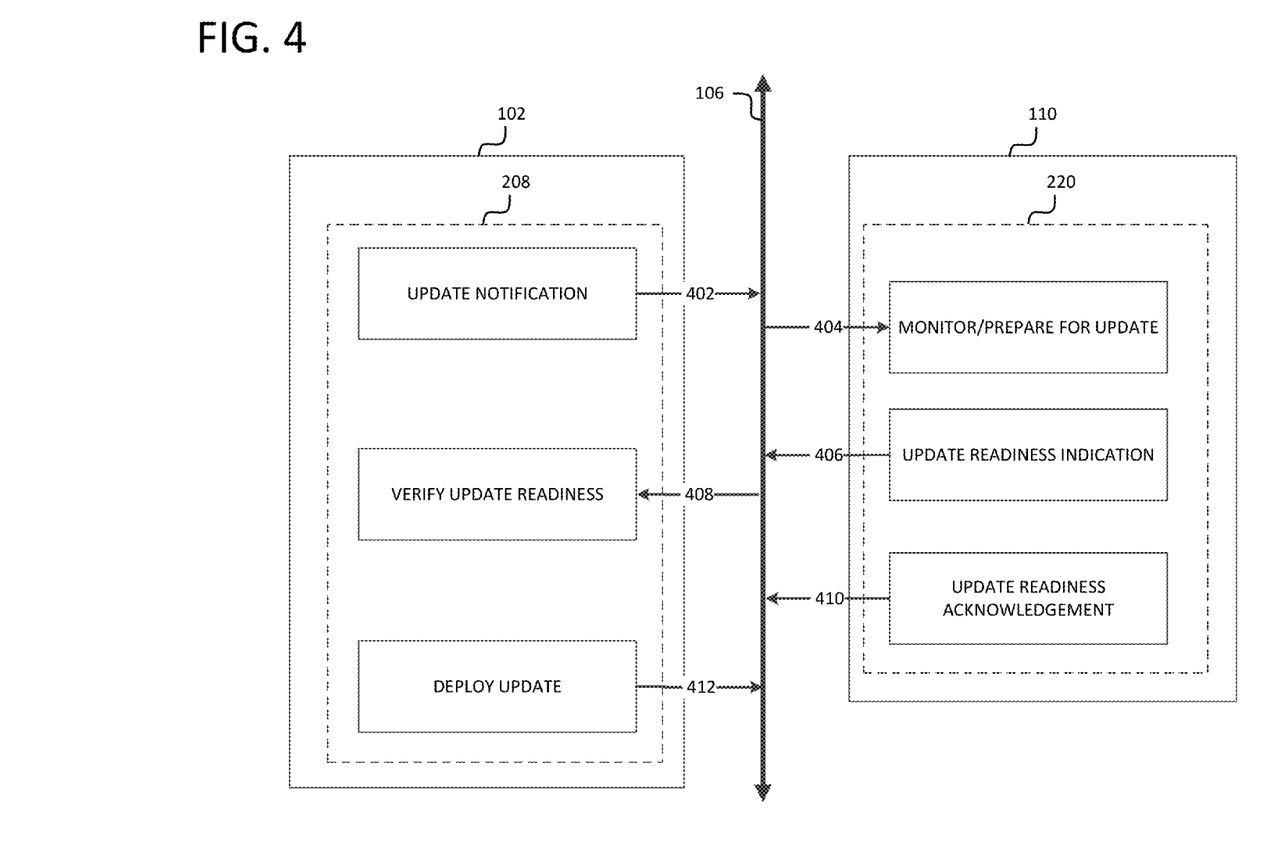
FIG. 4 illustrates an exemplary deployment of updates to an application from a development environment to a runtime environment in accordance with aspects of the invention.

FIG. 4 illustrates an exemplary process including a deploy operation of updates to an application object 210 in which deploy state monitor 212 provides interaction between development environment 208 and runtime environment 220. In an embodiment, a user changes one or more aspects of application object 210-A (e.g., via a GUI function block diagram) in order to ultimately change those aspects in a corresponding component of a processing system (e.g., fluid processing system 108). The user then initiates an update in order to deploy the changes made on application object 210-A to application object 210-B executing in runtime environment 220 on process controller 110. In an exemplary embodiment, an update is embodied as an extensible markup language (XML) file. At step 402, deploy state monitor 212 executing in development environment 208 sets a runtime value to notify application object 210-B executing in the runtime environment 220 that an update to the application object has been initiated. In an embodiment, step 402 is accomplished by REQ parameter 310, as further described herein.

Referring further to FIG. 4, application object 210-B monitors communications infrastructure 106 for the pending update and takes an action to prepare for the update (e.g., shut down process operation) at step 404. For example, application object 210-B executing on process controller 110-A of FIG. 1 may turn close valve 114-A and/or turn off pump 118. At step 406, application object 210-B indicates to deploy state monitor 212 whether it is ready to accept an update. For example, application object 210-B may indicate that it is currently executing a process and unable to accept an update, or that it is ready to accept an update but another application object executing in the runtime environment on the same process controller is executing a critical process and thus it is unable to accept an update. In an embodiment, step 406 is accomplished by READY parameter 304 and/or LOCK parameter 308 as further described herein. At step 408, deploy state monitor 212 presents a display of all impacted programs to identify conditions preventing the initiated update. For example, graphical function block diagrams in development environment 208 may graphically indicate to a user via a GUI that pump 118 is performing a process that is preventing the update. In another embodiment, development environment graphically presents a list of application objects 210 that are not ready for changes to be deployed.

At step 410, application object 210-B returns an indication to deploy state monitor 212 that it is ready to accept an update when, for example, the process component controlled by application object 210-B can handle an interruption during the update period without negatively impacting the processing system. In an embodiment, step 410 is accomplished by READY parameter 304 as further described herein. At step 412, deploy state monitor 212 proceeds with the initiated update when all impacted programs return a ready indication. For example, deploy state monitor 212 begins the update when all impacted application objects 210-B have their READY parameter 304 set to ON.

Figure 5:
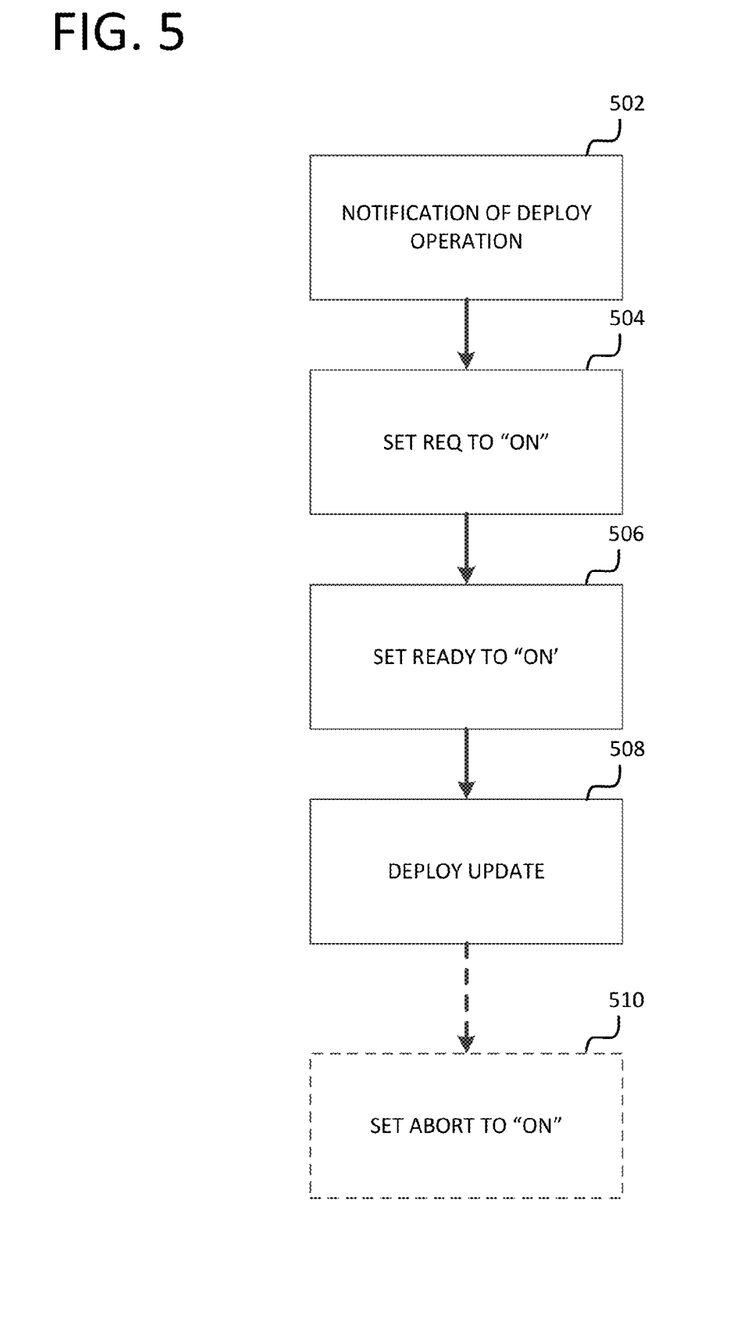
FIGS. 5-8 illustrate exemplary operations of a deploy state monitor in accordance with aspects of the invention.

FIG. 5 illustrates an exemplary operation of aspects of the invention. In an embodiment, a user changes one or more aspects of application object 210-A (e.g., via a GUI function block diagram) in order to ultimately change those aspects in a corresponding component of a processing system (e.g., fluid processing system 108). The user then initiates an update in order to deploy the changes made on application object 210-A to application object 210-B executing in runtime environment 220 on process controller 110. In an embodiment, an update is embodied as an XML file. At step 502, the low byte of CMD parameter 302 of deploy state monitor 212 indicates to deploy state monitor 212 that a deploy operation has been initiated. At step 504, deploy state monitor 212 sets the value of REQ parameter 310 to ON to notify application object 210-B that a deployment has been requested. The application object 210-B then sets the value of READY parameter 304 to ON to notify deploy state monitor 212 that the update can proceed at step 506. Responsive to the ON parameter, the configuration environment 208 initiates deployment of the update to application object 210 to the runtime environment 220 at step 508. In another embodiment, application object 210-B then sets the value of ABORT parameter 306 to ON at step 510 to notify deploy state monitor 212 that the update is to be aborted.

Figure 6:
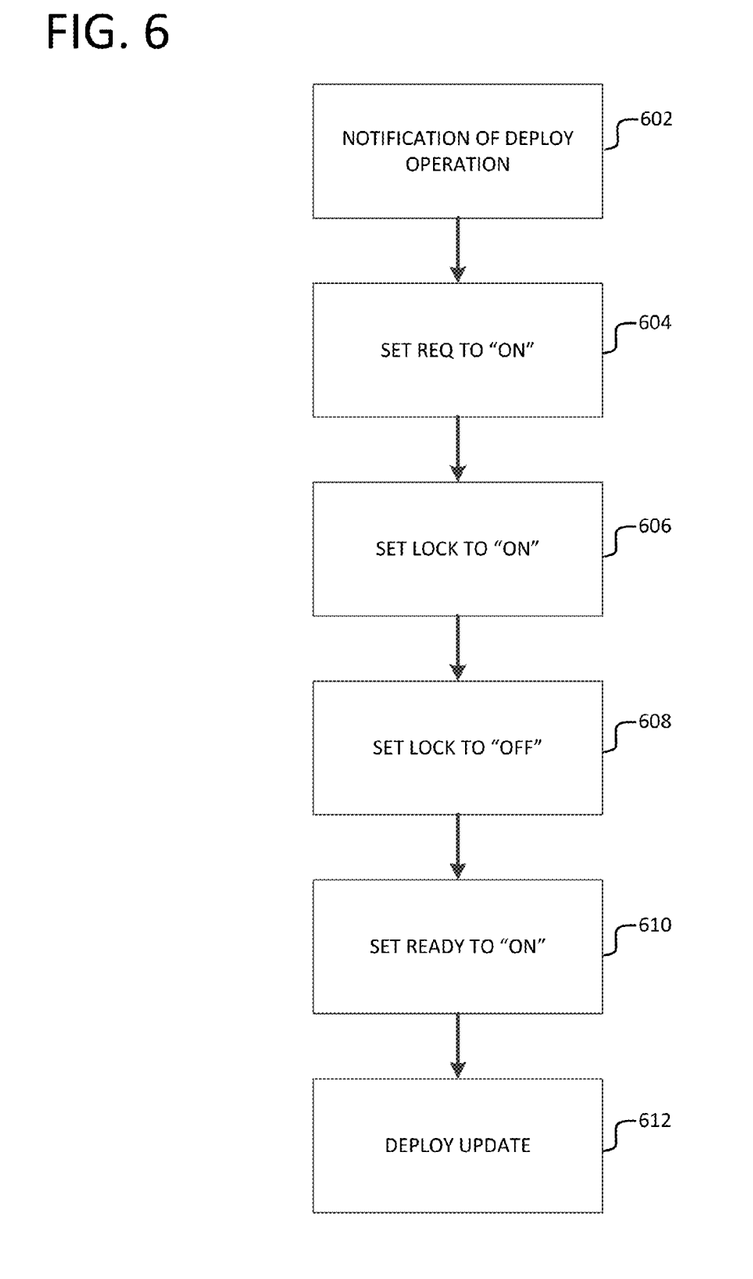

FIG. 6 illustrates another exemplary operation of aspects of the invention. In an embodiment, a user changes one or more aspects of application object 210-A (e.g., via a GUI function block diagram) in order to ultimately change those aspects in a corresponding component of a processing system (e.g., fluid processing system 108). The user then initiates an update in order to deploy the changes made on application object 210-A to application object 210-B executing in runtime environment 220 on process controller 110. In an embodiment, an update is embodied as an XML file. At step 602, development environment 208 interacts with logic of deploy state monitor 212 to notify deploy state monitor 212 that a deploy operation has been initiated via the low byte of CMD parameter 302 of deploy state monitor 212. At step 604, deploy state monitor 212 sets the value of REQ parameter 310 to ON to notify application object 210-B that a deployment has been requested. The application object 210-B then sets the value of LOCK parameter 308 to ON at step 606 to notify deploy state monitor 212 that the process controller 110 is performing a critical operation and the update cannot proceed at the current time. In an embodiment, the value of LOCK parameter 308 is set to ON after an analysis of relationships among application objects 210-B in the same runtime environment 220. At a future time, application object 210-B sets the value of LOCK parameter 308 to OFF at step 608 to notify deploy state monitor 212 that the process controller 110 is no longer performing the critical operation. The application object 210-B then sets the value of READY parameter 304 to ON to notify deploy state monitor 212 that the update can proceed at step 610. The deploy state monitor 212 then initiates deployment of the update to application object 210-B at step 612.

Figure 7:
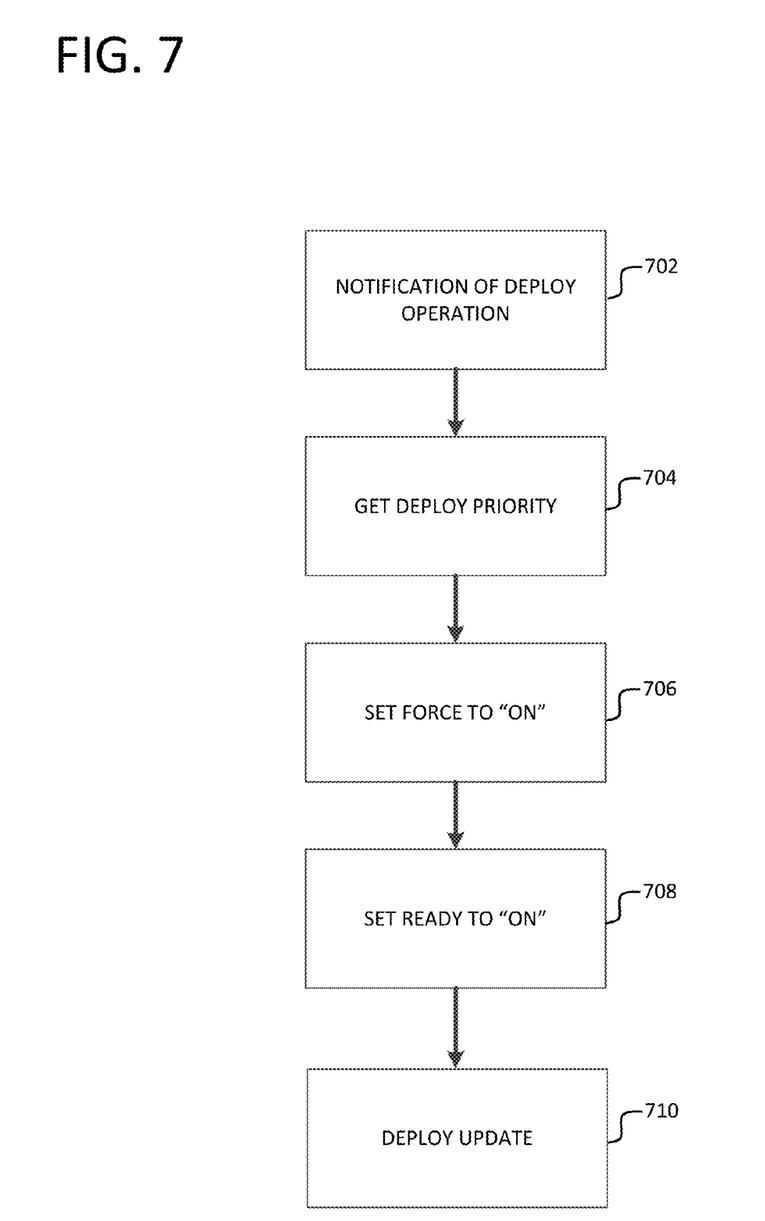

FIG. 7 illustrates yet another exemplary operation of aspects of the invention. In an embodiment, a user changes one or more aspects of application object 210-A (e.g., via a GUI function block diagram) in order to ultimately change those aspects in a corresponding component of a processing system (e.g., fluid processing system 108). The user then initiates an update in order to deploy the changes made on application object 210-A to application object 210-B executing in runtime environment 220 on process controller 110. In an embodiment, an update is embodied as an XML file. At step 702, the deploy process notifies deploy state monitor 212 that a high priority deploy operation has been initiated via the low byte of CMD parameter 302 of deploy state monitor 212. At step 704, deploy state monitor 212 receives an indication of the deploy priority. In an embodiment, the deploy priority is indicated by a value ranging from 1 (e.g., update can occur at any time) to 100 (e.g., update is critical and must occur now), including a mid-range value 50 (e.g., let an operator make the choice of whether to update now). In another embodiment, the deploy priority includes a scheduled deployment based on a deployment ready state. At step 706, deploy state monitor 212 sets the value of FORCE parameter 312 to ON to notify application object 210-B of the high priority deploy. The application object 210-B then sets the value of READY parameter 304 to ON in a timely manner at step 708 to notify deploy state monitor 212 that the update can proceed. The deploy state monitor 212 then initiates deployment of the high priority update to application object 210-B at step 710.

Figure 8:
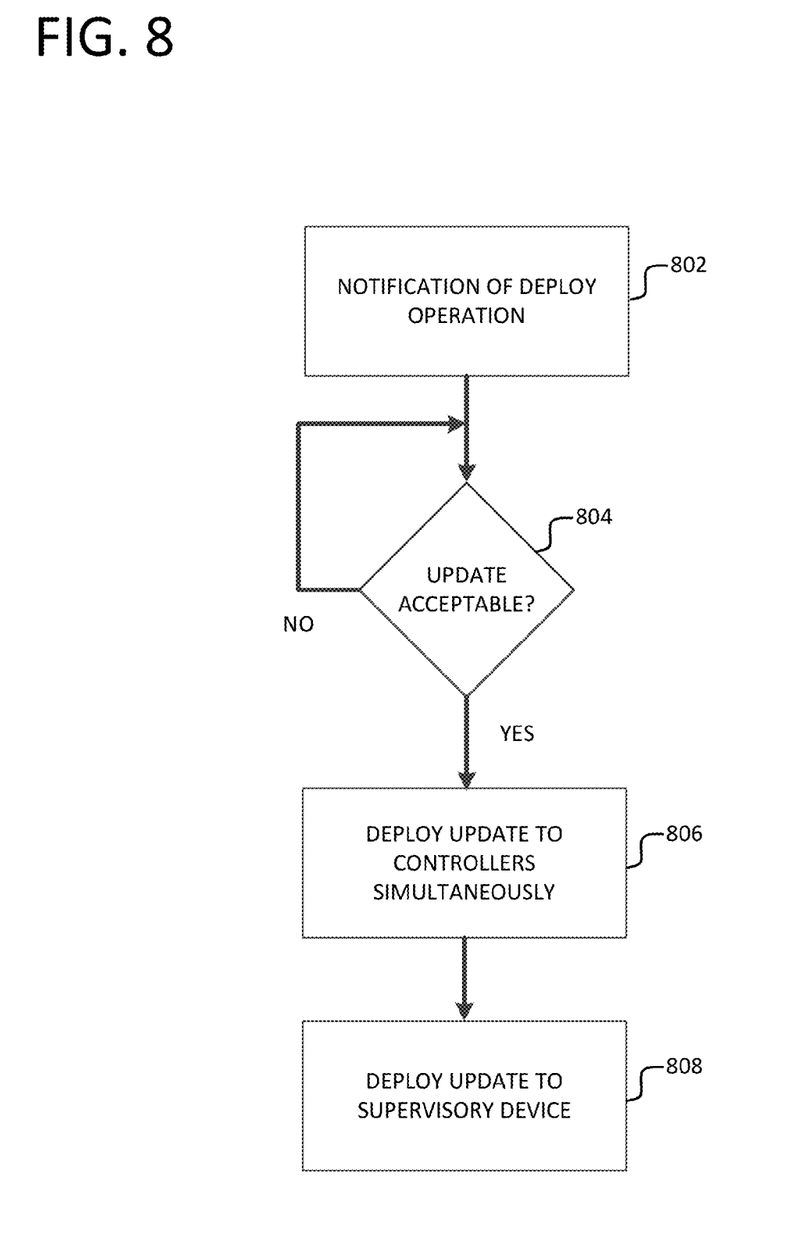

FIG. 8 illustrates another exemplary operation of aspects of the invention. In an embodiment, a user changes one or more aspects of multiple application objects 210-A (e.g., via a GUI function block diagram) in order to ultimately change those aspects in a corresponding component of fluid processing system 108 (e.g., valves 114). The user then initiates an update in order to deploy the changes made on application objects 210-A to application objects 210-B executing in runtime environment 220 on a multiple process controllers 110. In an embodiment, an update is embodied as an XML file. At step 802, the application objects 210-B are notified of the requested deploy by deploy state monitor 212. At step 804, deploy state monitor 212 determines whether the portions of the processing system impacted by the update are able to accept the update at this time. For example, deployment can be prevented if a potential change impacts a running process on any process controller 110. In an embodiment, logic to detect abnormal controller and network behavior is automatically inserted into control code by deploy state monitor 212 to safeguard equipment and improve overall system reliability. When deploy state monitor 212 determines the impacted portions cannot accept the update, the process stays at step 804. When deploy state monitor 212 determines the impacted portions can accept the update, it deploys the update to all impacted process controllers 110 simultaneously at step 806. In an embodiment, the update is deployed while fluid processing system 108 is online. The deploy state monitor 212 then deploys the update to supervisory device 104 (e.g., HMI) at step 808 once process controllers 110 have been updated.

Aspects of the invention can integrate Internet of Things (IoT) devices and PLC co-processor modules using a Linux Runtime Engine. Aspects of the invention can also import computer-aided drawings (CAD), I/O spreadsheets, equipment databases, and the like via a comma-separated values (CSV) import utility. Additionally, aspects of the invention can be extended with XML importing and exporting for advanced two-way configuration. Further aspects of the invention can be integrated via XML with other applications (e.g., Wonderware Intelligence available from Schneider Electric) to realize the full potential of a standardized system. Moreover, aspects of the invention can create batch phases (e.g., Wonderware InBatch available from Schneider Electric). Aspects of the invention also provide multi-user and version management capabilities.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

```
##output add
//
// Prometheys Deploy State Monitor
//
// The deploy state monitor provides interaction with the deploy application to prevent updates that may impact the object
// during runtime execution. The DEPLOY_REQ output is set ON when a deploy is initiated by the deploy application that impacts
// the object containing this Function Block. The PRIORITY privides an integer value that can be set by the deploy application
// to indicate the priority of the deploy. The value 1 (default) is the lowest priority upto 999.
//
//
// The low word of CMD is set by the deploy application and represents the deploy priority
// The high word of CMD is set by this function by setting READY, PREVENT or REJECT to true (ON).
```

APPENDIX A-continued

```
//
// The Deploy CMD is known to the deploy application by the CMD Interface Global Property: Type = DeployStateMonitor.
//
// Application:
// Set "OK" to notify the deploy application when the object is ready for update
// Set "TagOut" to notify the deploy application that a deploy is not permissable as it may disrupt the operation of the object
// Set "Cancel" to notify the deploy application that the object will not be ready for deploy (typically via an operator response)
//
// NOTE: An object setting the TagOut state will be notified of deploy requests even when the object is not in the deploy set. The
//       only needs to remove the TagOut state to enable deploy to proceed (i.e. it does not neeed to indicate OK if it is not
//       in the deploy set).
//
##if me.EN.Connected
if( me.EN )
{
##endif
   me.cmd_read = me.CMD & 0xffff;          //Mask the command component of the incoming command integer
   me.cmd_write = 0;                       //Initialize the write integer
   me.Update = (me.cmd_read > 0);          //Set the deploy output true if the deploy command is being set by the deploy application
   me.Priority = me.cmd_read;              //Transfer the incoming command integer to the priority output for external reference
   if (me.TagOut)
   {
      me.cmd_write = 90;                   //Notify the deploy application to disable all deploy even when this object is not within the deploy set
   }
   else if (me.Cancel)
   {
      me.cmd_write = 50;                   //Operator has requested via the object to notify the deploy application that the system is not available for deploy
   }
   else if (me.OK)
   {
      me.cmd_write = 60;                   //Object is ready to accept a deploy update
   }
   me.CMD = me.cmd_read | (me.cmd_write << 16);    //Write the response back to the deploy application via the high word of the command integer
   me.OK = false;
   me.Cancel = false;
   me.TagOut = false;
##if me.EN.Connected
}
##endif
##if me.ENO.Connected
##if me.EN.Connected
me.ENO = me.EN;
##else
me.ENO = true;
##endif
##endif
```

What is claimed is:

1. A system, comprising:
a server computing device coupled to a control device by a communications network; and
processor-executable instructions stored on a computer-readable storage medium, said processor-executable instructions including instructions that, when executed by the server computing device, provide:
a development environment, the development environment associated with a runtime environment provided by the control device,
an instance of an application object executing in the development environment, the instance of the application object executing in the development environment corresponding to an instance of the application object executing in the runtime environment,
interaction between the development environment and a deploy state monitor to monitor transitions of the control device to a safe state, the deploy state monitor executing within the instance of the application object executing in the runtime environment, and
deployment of an update to the application object executing in the runtime environment after the deploy state monitor indicates the control device has transitioned to the safe state,
wherein the interaction comprises the deploy state monitor setting a request parameter to indicate initiation of the deployment.

2. The system of claim 1, wherein the interaction further comprises the instance of the application object executing in the runtime environment setting a ready parameter in response to the request parameter to indicate the operational state of the instance of the application object executing in the runtime environment is ready for the deployment.

3. The system of claim 1, wherein the interaction further comprises the instance of the application object executing in the runtime environment setting an abort parameter in response to the request parameter to cause the deployment to be aborted.

4. The system of claim 1, wherein the interaction further comprises the instance of the application object executing in the runtime environment setting a lock parameter in response to the request parameter to prevent modification of the instance of the application object executing in the runtime environment.

5. The system of claim 1, wherein the interaction comprises the deploy state monitor setting a force parameter to indicate the deployment has a high priority.

6. The system of claim 1, wherein the control device controls a device of a continuous process during deployment of the update.

7. The system of claim 1, wherein the application object executing in the runtime environment transitions a device of a continuous process into an idle state in response to the interaction.

8. A method of deploying an update of an application object during a runtime operation, comprising:
  executing a deploy state monitor within a runtime environment via processor-executable instructions stored on a computer-readable storage medium of a control device, wherein the control device is coupled to a computing device by a communications medium, and wherein the computing device is configured to provide a development environment associated with the runtime environment via processor-executable instructions stored on a computer-readable storage medium of the computing device;
  providing an instance of an application object within the development environment via the processor-executable instructions;
  initiating a deployment of an update of the application object within the development environment to an instance of the application object executing in the runtime environment;
  interacting, by the deploy state monitor, with the instance of the application object executing in the development environment to monitor a transition of the control device to a safe state for the deployment; and
  deploying the update in the runtime environment via the communications medium responsive to the interacting, wherein the interacting includes setting, by the deploy state monitor, a request parameter to indicate initiation of the deployment.

9. The method of claim 8, wherein the interacting further includes setting a ready parameter by the instance of the application object executing in the runtime environment in response to the request parameter to indicate the operational state of the instance of the application object executing in the runtime environment is ready for the deployment.

10. The method of claim 8, wherein the interacting further includes setting an abort parameter by the instance of the application object executing in the runtime environment in response to the request parameter to cause the deployment to be aborted.

11. The method of claim 8, wherein the interacting further includes setting a lock parameter by the instance of the application object executing in the runtime environment in response to the request parameter to prevent modification of the instance of the application object executing in the runtime environment.

12. The method of claim 8, wherein the interacting includes setting, by the deploy state monitor, a force parameter to indicate the deployment has a high priority.

13. The method of claim 8, further comprising controlling, by the control device, a device within a continuous process during the deploying step.

14. The method of claim 8, further comprising transitioning, by the control device, a device within a continuous process into an idle state in response to the interacting step.

15. A system, comprising:
  a controller coupled to an industrial process, wherein the controller includes a processor executing processor-executable instructions to provide a runtime execution environment;
  a computing device coupled to the controller by a communications network, wherein the computing device includes a processor executing processor-executable instructions to provide a development environment associated with the runtime environment;
  wherein processor-executable instructions comprising a deploy state monitor executing within the runtime execution environment are configured to interact with processor-executable instructions comprising
  an application object executing within the development environment to monitor transitions of an operational state of the application object executing in the runtime execution environment; and
  wherein the processor-executable instructions comprising the deploy state monitor are configured to initiate deployment of an update of the application object from the development environment to the runtime execution environment, by setting a request parameter to indicate initiation of the deployment, after the operational state of the application object executing in the runtime execution environment transitions to a safe state.

16. The system of claim 15, wherein the controller is configured to control one or more devices comprising the industrial process by executing the application object within the runtime execution environment.

17. The system of claim 15, wherein the deploy state monitor is configured to interact with the application through one or more parameters implemented by processor-executable instructions.

18. The system of claim 15, wherein the deploy state monitor is configured to interact with the application through an application programming interface associated with the controller.

* * * * *